US006993199B2

(12) United States Patent
Chebil

(10) Patent No.: US 6,993,199 B2
(45) Date of Patent: Jan. 31, 2006

(54) METHOD AND SYSTEM FOR IMPROVING CODING EFFICIENCY IN IMAGE CODECS

(75) Inventor: Fehmi Chebil, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 755 days.

(21) Appl. No.: 09/956,587

(22) Filed: Sep. 18, 2001

(65) Prior Publication Data

US 2003/0063810 A1    Apr. 3, 2003

(51) Int. Cl.
*G06K 9/36* (2006.01)
(52) U.S. Cl. .................................................. 382/240
(58) Field of Classification Search ............. 375/240.2, 375/240.19, 240.18, 240.11; 382/250–251, 382/247–248, 240, 236, 233, 232
See application file for complete search history.

(56) References Cited

U.S. PATENT DOCUMENTS

| | | | |
|---|---|---|---|
| 6,208,761 B1 | 3/2001 | Passaggio et al. | 382/237 |
| 6,236,757 B1 | 5/2001 | Zeng et al. | 382/240 |
| 6,266,414 B1 * | 7/2001 | Bradley et al. | 380/240 |

FOREIGN PATENT DOCUMENTS

| | | |
|---|---|---|
| DE | 19544094 | 11/1995 |
| WO | 9834398 | 8/1998 |
| WO | 0120897 | 3/2001 |

OTHER PUBLICATIONS

"Structure-related perceptual weighting: a way to improve embedded zerotree wavelet image coding"; Jiaming Li et al.; Electronics Letters, IEE Stevenage, GB, vol. 33, No. 15, Jul. 17, 1997, pp. 1305-1306.

* cited by examiner

*Primary Examiner*—Joseph Mancus
*Assistant Examiner*—Duy M. Dang
(74) *Attorney, Agent, or Firm*—Ware, Fressola, Van Der Sluys & Adolphson

(57) ABSTRACT

A method and system for encoding an image for providing encoded data for transmission or storage. After the image is decomposed by a transform into sub-bands containing blocks or samples of transformed image data organized in a number of bit-planes, it is adjusted to reduce the number of bit-planes prior to being encoded by a bit-plane coder into encoded data. The reduction of the bit-planes is based on the compression factor of the encoding process, the transmission target bit-rate, the type of sub-band and the resolution level of the transformed image data.

34 Claims, 8 Drawing Sheets

METHOD AND SYSTEM FOR IMPROVING CODING EFFICIENCY IN IMAGE CODECS

FIELD OF THE INVENTION

The present invention relates generally to digital image compression, and more particularly, to sub-band decomposition based bit-plane coders.

BACKGROUND OF THE INVENTION

It is generally known that image compression is effective in reducing the amount of image data for transmission or storage. In particular, with the introduction of scalable image coding formats like the JPEG2000, it has become possible to send and receive only a fraction of the image file and still reconstruct a high-quality image at the receiving end. The part that is dropped from the image usually contains information that describes the high-frequency components present in the image, corresponding to the details that the human visual system (HVS) is not very sensitive to.

JPEG stands for Joint Photographic Experts Group. In 1988 this committee adopted its first standard, known as the JPEG baseline, which is based on discrete cosine transform (DCT) and on Huffman coding. In 1996, a call for proposals to advance a standardized image-coding system for the new millennium was issued and many algorithms were proposed. Presently, a new standard, named JPEG2000, has been finalized. This new standard provides low bit-rate operation, with rate-distortion and subjective image quality performance superior to existing standards, without sacrificing performance at other points in the rate-distortion spectrum. More importantly, JPEG 2000 allows extraction of different resolutions, pixel fidelities, region of interest, multiple components, and more, all from a single compressed bitstream. This allows a user to manipulate, store or transmit only the essential information for any target device from any JPEG2000 compressed source image. The JPEG2000 coder is one example of the sub-band decomposition based bit-plane coders.

JPEG2000 uses wavelets as the basis for its coding scheme. With wavelet-based coding, most of the image information is coded in the earlier stages of compression, giving good reconstruction at low rates. In JPEG2000 and other scalable image codecs, the coded image information that contributes most of the image quality is placed first in the image file. In these types of image codecs, bit-plane coders are used to encode the wavelet samples in bit-planes. The bit-plane coders encode the samples starting from their most significant bit-plane. When the encoded image data is transmitted from the transmit side to a receiver, the transmitted data is limited to the available transmission bandwidth. In other words, the encoded image data must be reduced to meet a target bit-rate. It is known that the encoded image data can be reduced for transmission without substantially degrading the quality of the reconstructed image by eliminating only the least important bits of a codestream. Thus, when the image data is compressed for transmission or for storage, it is essential to include the data that contributes most to the image. One way to achieve this is to use a rate-distortion optimization algorithm. A rate-distortion optimization algorithm organizes the image data according to its contribution to the reduction in the distortion in the image to be encoded. The distortion to the image can be measured by the mean-square error, for example.

Currently image compression algorithms are used to generate codestream representations of images in a quality or resolution scalability fashion. Scalability allows multiple images with different qualities or different resolutions to be extracted from the same codestream. Thus, the same codestream can be provided to multiple applications of different capabilities. To provide a quality scalable codestream that offers optimal image quality while allowing the codestream to be truncated at different points, the rate-distortion algorithm should operate on optimizing the image compression on those truncation points.

In order to improve the image quality by avoiding the truncation at random points, WO 98/34398 (Li et al.) discloses a rate-distortion optimized embedding (RDE) for optimizing rate-distortion performance by coding information bits in the order of the steepest rate-distortion slope. However, the major drawback of the method used in WO 98/34398 is that all bit-planes must be encoded to determine the ratio of information to the target bit-rate or the target file size. At medium and low bit-rate applications, a large section of the generated codestream is discarded by the rate-distortion allocator to meet the target bit-rate. This means that a significant portion of the already encoded data will not be included in the final image. Rather, this portion of encoded data is eliminated in the truncation process. Thus, while compression efficiency is improved, the computation complexity is increased and part of the CPU time needed for image compression is wasted in encoding the unused data. In telecommunication applications where computation resources are costly, the wasted CPU time should be avoided or minimized.

U.S. Pat. No. 6,236,757 B1 (Zeng et al.) discloses an image compression method wherein an input image is divided into a plurality of image segments and each segment is assigned to a wavelet transform filter from a bank of filters for transformation. The image filters are adapted for different types of image content such as sharp edges, and slow varying contours. After transformation, the coefficients for different segments are combined in a composite wavelet coefficient image. Such a composite image allows joint, rate-distortion optimized coding of a segmented image, thereby optimally allocating bits between the transforms of the image segments for providing an easily scalable bitstream to meet a target bit-rate. The major disadvantage of this approach is that an entropy estimator must be used to for filter selection. More specifically, the entropy values of each image segment associated with all the filters in the filter bank must be evaluated and compared. This entropy estimation procedure also increases the computational complexity of the coder.

To illustrate the wastefulness in CPU time in prior art truncation methods, a brute-force approach is shown in FIGS. 1a and 1b. With this approach, after an image is decomposed by a wavelet transform (or discrete cosine transform) into samples, as shown in FIG. 1a, the samples in the transform domain are compressed bit-plane by bit-plane, starting from the most significant bit. The codestream representing the compressed image is then formed by ordering the contribution of the bits according to their distortion reduction. As such, the most important bits of the codestream are emphasized in order to achieve the optimal image quality. With this brute-force approach, like most prior art methods, all the bit-planes in each image sample are compressed as if a full codestream will be generated for transmission or storage, as shown in FIG. 1b. However, when the actual codestream is generated, a substantial part of the compressed data is discarded in order to meet the target bit-rate for transmission, or the target file size for storage. In this illustrated example, the discarded part is equivalent to half of the total bit-planes of the encoded image data. Thus, 50 percent of the CPU time used in the compression procedure is wasted in "unnecessary data coding".

Thus, it is desirable and advantageous to provide a method and system for image coding wherein the unnecessary data coding is reduced and the computational complexity is minimized.

SUMMARY OF THE INVENTION

According to the first aspect of the invention, a method of encoding an image at a compression factor for providing encoded data for transmission or storage, wherein the image is decomposed by a transform into sub-bands of one or more resolution levels, each sub-band containing units of transformed image data organized in a first number of bit-planes, said method comprising the steps of:

assigning to the sub-bands one or more weighting indices indicative of the compression factor and the resolution level;

adjusting, for each unit, the transformed image data according to the weighting indices for providing adjusted transformed image data having a second number of bit-planes smaller than the first number; and encoding the adjusted transformed image data for providing the encoded data.

According to the present invention, the units can be blocks or samples.

Preferably, the transform is a wavelet-based transform.

According to the present invention, each sub-band is indicative of a group of transformed coefficients resulting from bandpass filtering operations regarding the transform, and wherein the weighting indices are dependent upon the filtering operations.

According to the second aspect of the present invention, an encoder for encoding an image at a compression factor for providing encoded data for transmission or storage, wherein the image is decomposed by a transform into sub-bands of one or more resolution levels, each sub-band containing units of transformed image data represented in a first number of bit-planes, said encoder comprising:

means, responsive to the transformed image data, for assigning to the sub-bands one or more weighting indices indicative of the compression factor and the resolution level for providing information indicative of the assigned weighting indices;

means, responsive to the information, for adjusting the transformed image data for each unit according to the weighting indices for providing further data indicative of adjusted transformed image data having a second number of bit-planes smaller than the first number; and means, responsive to the further data, for encoding the adjusted transformed image data for the encoded data.

According to the third aspect of the present invention, an image coding system having a transmit side and a receive side; comprising:

an encoder on the transmit side for coding an image at a compression factor for providing encoded data for transmission or storage, wherein the image is decomposed by transform into sub-bands of one or more resolution levels, each sub-band containing units of transformed image data represented in a first number of bit-planes, wherein the encoder comprises:

means, responsive to the transformed image data, for assigning to the sub-bands one or more weighting indices indicative of the compression factor and the resolution level for providing information indicative of the assigned weighting indices;

means, responsive to the information, for adjusting the transformed image data for each unit according to the weighting indices for providing further data indicative of adjusted transformed image data having a second number of bit-planes smaller than the first number; and means, responsive to the further data, for encoding the adjusted transformed image data for providing a codestream indicative of the encoded adjusted transformed image data; and a decoder on the receive side, responsive to codestream, for reconstructing the image based on the encoded adjusted transformed image data.

The present invention will become apparent upon reading the description taking in conjunction with FIGS. 2–6.

DETAILED DESCRIPTION

Figure 2:
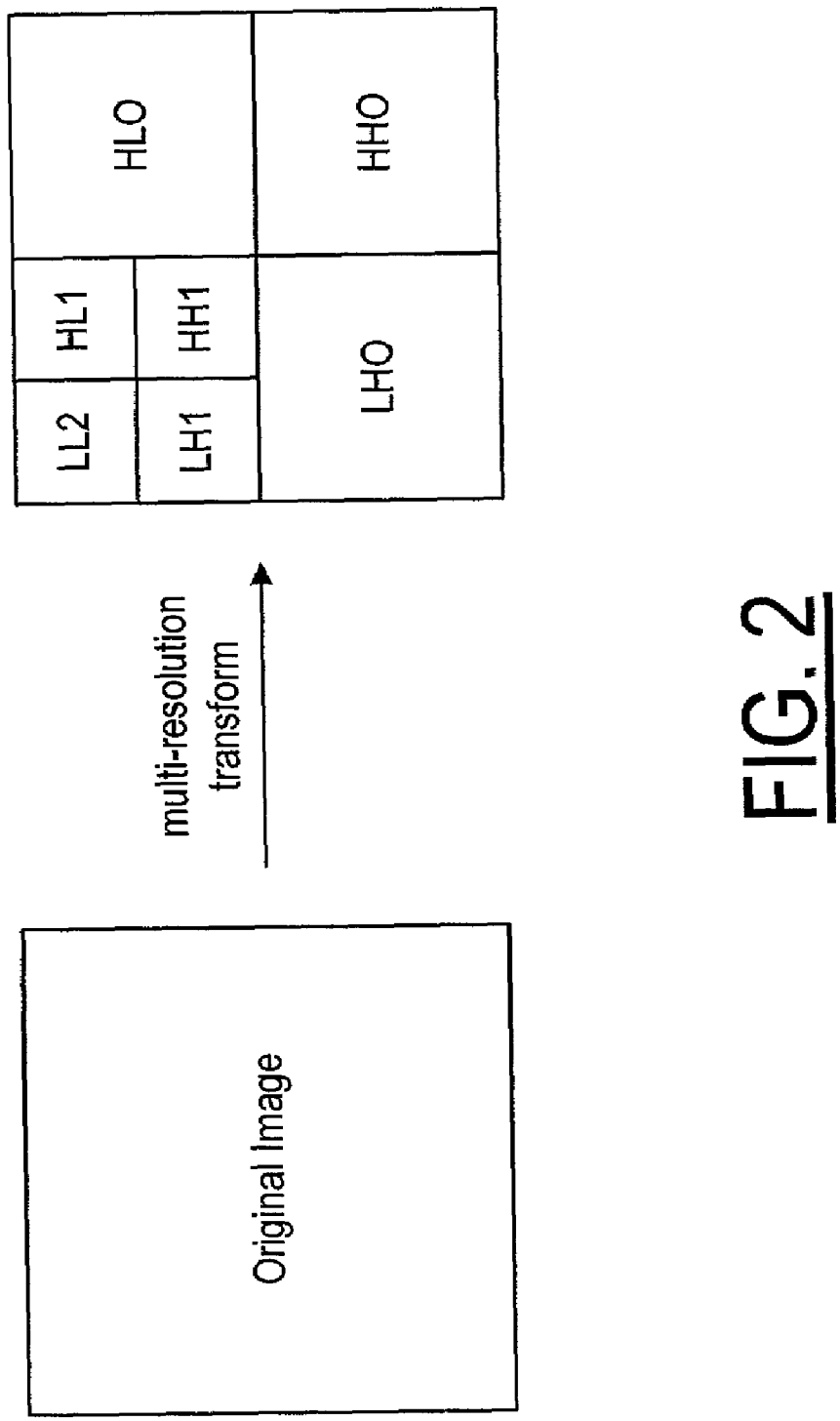
FIG. 2 is a diagrammatic representation illustrating dyadic decomposition of an image using a two resolution-level transform.

FIG. 2 shows the result of a typical multi-resolution transform. As shown, the original image is decomposed into two resolution levels: the first level includes the sub-bands HL0, HH0 and LH0; and the second level includes the sub-bands HL1, HH1, LH1 and LL2. In a three-level decomposition, the LL2 sub-band will be further decomposed into sub-bands HL2, HH2, LH2 and LL3 in a similar fashion. According to the present invention, the resolution level can be one, two or more. Furthermore, the decomposition can be wavelet-based, but it can also be based on discrete-cosine transform (DCT) or the like.

Figure 3A:
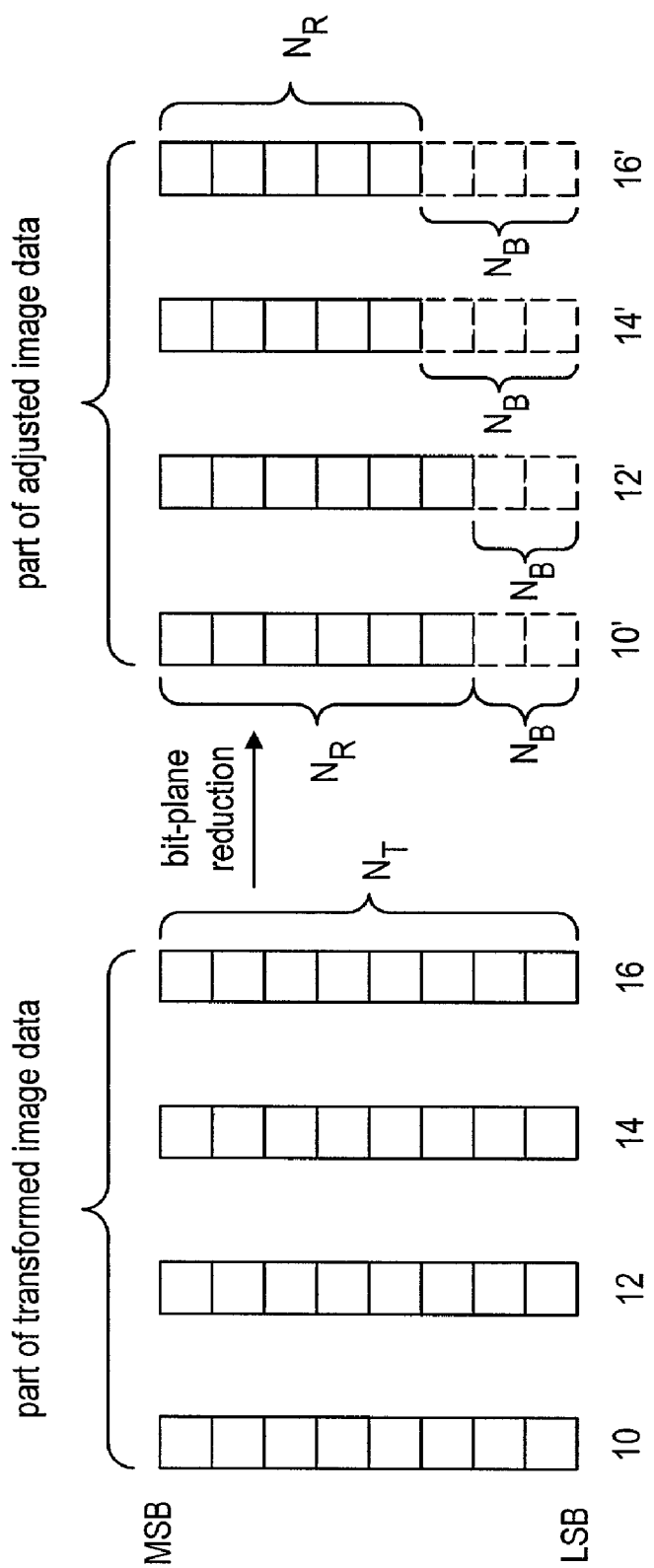
FIG. 3a is a diagrammatic representation illustrating part of the bit-planes in transformed image data being omitted prior to compression, according to the present invention.
Figure 3B:
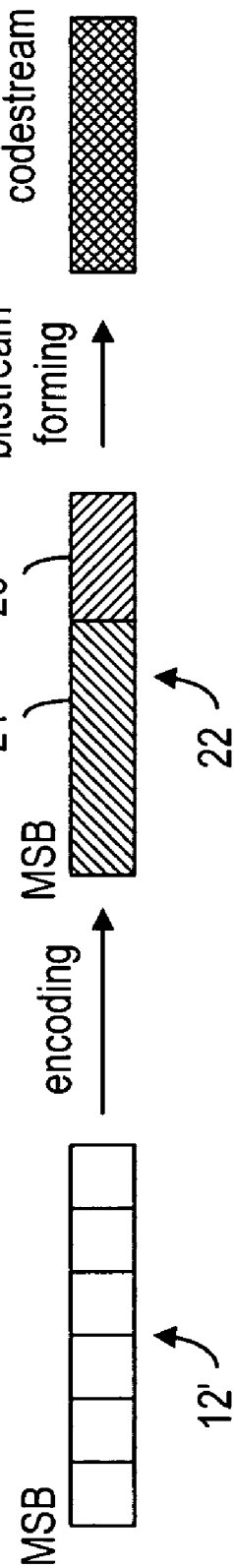
FIG. 3b is a diagrammatic representation illustrating the adjusted transformed image data being encoded and the encoded data is further truncated in a generated codestream.
Figure 4:
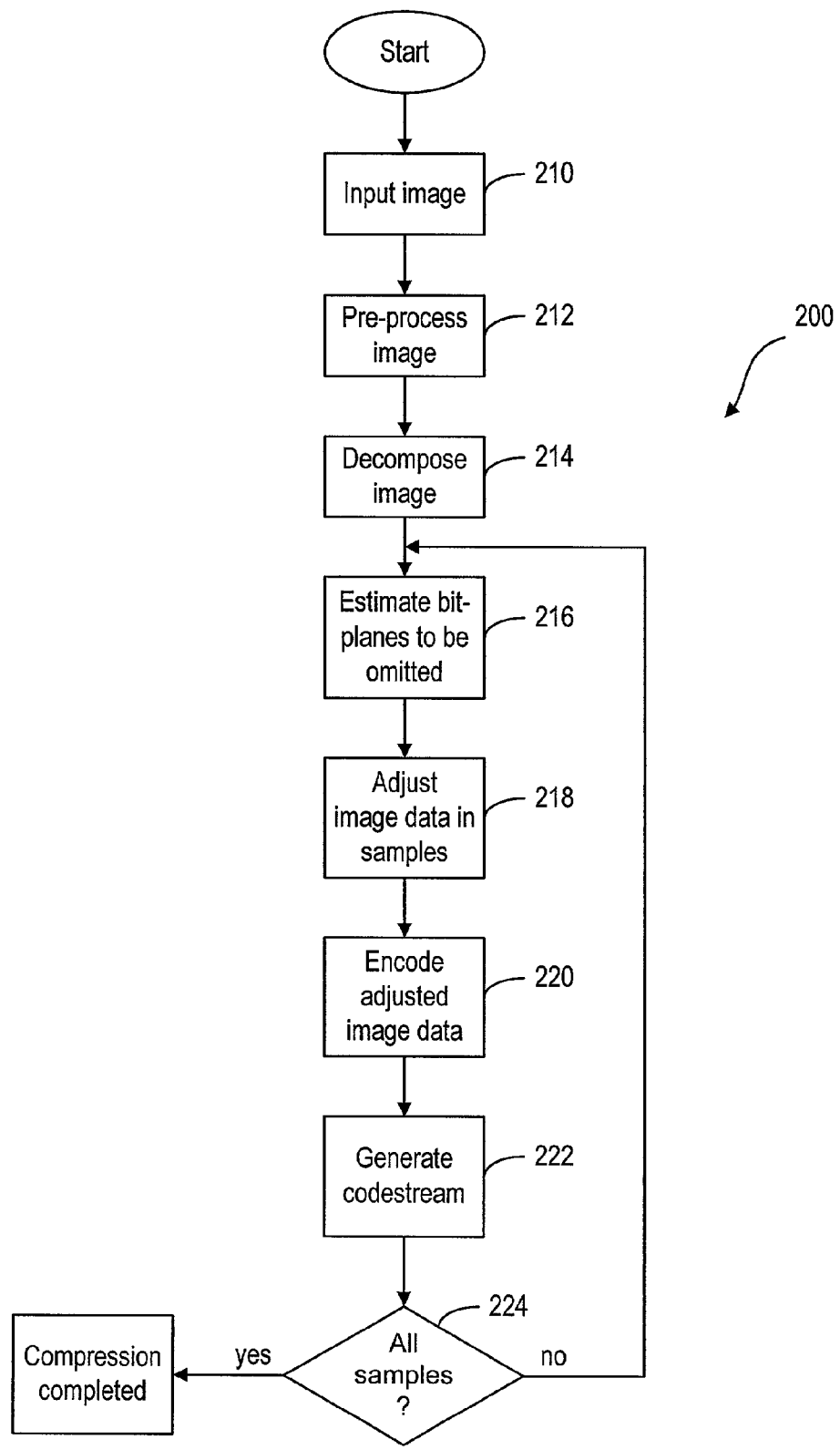
FIG. 4 is a flowchart illustrating the method of image coding, according to the present invention.

FIGS. 3a to 4 illustrate the method for reducing "unnecessary data coding", according to the present invention. After an image is decomposed into sub-bands of different resolution levels, wherein each sub-band contains a plurality of samples of transformed image data represented in a number of bit-planes, the transformed image data in each sample is adjusted in order to reduce the number of bit-planes, as shown in FIG. 3a. As shown, the samples are denoted by reference numerals 10, 12, 14 and 16. The transformed image data in each of the samples is organized in eight bit-planes, for example, with the most significant bit (MSB) on the top and the least significant bit (LSB) on the bottom. The number of the bit-planes representing the transformed image data in each sample is referred to as $N_T$. In FIG. 3, $N_T$ is equal to 8, but it can be smaller or greater than 8. In order to reduce the time spent in coding the "unnecessary data", it is preferable to predict which bit-planes will not be used in the final bitstream (the actual codestream to be generated for transmission at a target bit-rate or for storage at a target file size) so that the predicted unused bit-planes will be omitted in the compression or coding process. The number of the omitted bit-planes in each sample is referred to as $N_B$. With a wavelet transform or the like, it is possible to determine the contribution of wavelet coefficients to the generated bitstream, according to peak signal-to-noise ratio distortion measure. As it is known, in the wavelet-based transform, low resolution levels represent an average of the image. Thus, the number of bit-planes that can be omitted is greater in higher resolution levels than that in the low resolution levels. For example, as shown in FIG. 2, the LL2, HL1, HH1 and LH1 sub-bands belong to the same resolution level, which can be designated as resolution level 1, and the HL0, HH0 and LH0 sub-bands are in the designated resolution level 2. A sub-band is a group of transformed coefficients resulting from the same sequence of low-pass and high-pass filtering operations, both vertically and horizontally. It is also a characteristic of the wavelet transform that, in the same resolution level, the samples belonging to different sub-bands contribute to the image quality differently. The LL band contains most of the image information, whereas the HH band contains mostly the edges of the images. Accordingly, the HH band always has less bit-planes than the other sub-bands to be included in the generated bitstream. Furthermore, the number of bit-planes to be omitted can be dependent on the compression factor applied on the image. It is thus possible to estimate the number of omitted bit-planes as follows:

$$N_B = f(\text{resolution\_level}) + g(\text{band\_index}) + h(\text{compression\_factor}) \quad (1)$$

For example, it is possible to set $f(\text{resolution\_level}) = \text{resolution level};$ $g(\text{band\_index}) = 1$ if the sub-band is an $HH$ band $= 0$ else.

$h(\text{compression\_factor}) = \text{compression factor}.$

The compression factor of an image depends on the image resolution and the target bit rate for transmission or the target file size for storage. For setting the value of h, it is possible to use a look-up table (LUT) based on the image resolution and the target bit-rate/file-size. The image resolutions can be classified according to the convention resolutions for various image types in digital imaging. The convention resolution for QCIF is (176 by 144), CGA (320 by 200), CIF (352 by 288), VGA (640 by 480) and SVGA (800 by 600). The compression factor can be classified into three values: High=2, medium=1 and low=0 according to the target bit-rate/file-size. For example, 1 bit-per-pixel is considered high compression for a QCIF image (h=2), whereas the same target bit-rate is considered medium compression for a VGA image (h=1).

As illustrated in FIG. 3a, the samples 10 and 12 belong to the sub-band LH1 whereas the samples 14 and 16 belong to the sub-band HH1 of a VGA image to be encoded into a codestream at a rate of 1 bit-per-pixel. Thus, we have g=0 for samples 10 and 12, g=1 for samples 14 and 16 and h=1 and f=1 for all samples. Accordingly, $N_B=2$ for samples 10 and 12, and $N_B=3$ for samples 14 and 16. After adjusting the transformed image data for bit-plane reduction, according to the present invention, the samples of adjusted image data are denoted by reference numerals 10', 12', 14' and 16'. The number of bit-planes, $N_R$, of the transformed image data to be compressed or encoded is 6 for samples 10' and 12' and 5 for samples 14' and 16'. Similarly, for the transformed image data in the samples belonging to LL2 and HL1 of the same VGA image, the number of omitted bit-planes, $N_B$, is equal 2. $N_B=3$ for that belongs to the sub-bands HL0 and LH0, and $N_B=4$ for that belongs to the sub-band HH0.

After the samples 10', 12', 14' and 16' are encoded, starting from the MSB of each sample, into encoded data, the ordering of encoded data sample bit-planes in the process of rate-distortion optimization such that, in case that the encoded data is more than the amount allowed by the target bit-rate/file-size, part of the less significant bit-planes will be further omitted in the generated codestream for transmission or storage. As shown in FIG. 3B, after the adjusted transformed image data in the sample 12' is encoded into encoded data 22, only the portion 24 is used for codestream generation. The portion 26 is unused for transmission or storage by truncation according to bit-plane ordering. As illustrated, the used portion 24 is equivalent to 4 bit-planes and the unused portion 26 is equivalent to 2 bit-planes. If the adjusted transformed image data in the sample 14' is encoded into encoded data and further generated into codestream for transmission or storage, at the same target bit-rate/file-size, then the unused amount of encoded data in the sample 14' is equal to 1 bit-plane. Likewise, the unused portion of the encoded data in the adjusted transformed image data in the samples belonging to LL2 and HL1 of the same VGA image is equivalent to 2 bit-planes, and the unused portion of the encoded data in the adjusted transformed image data in the samples belonging to HL0 and LH0 is 1 bit-plane. No unused encoded data is in the adjusted transformed image data in the samples belonging to HH0.

Figure 1A:
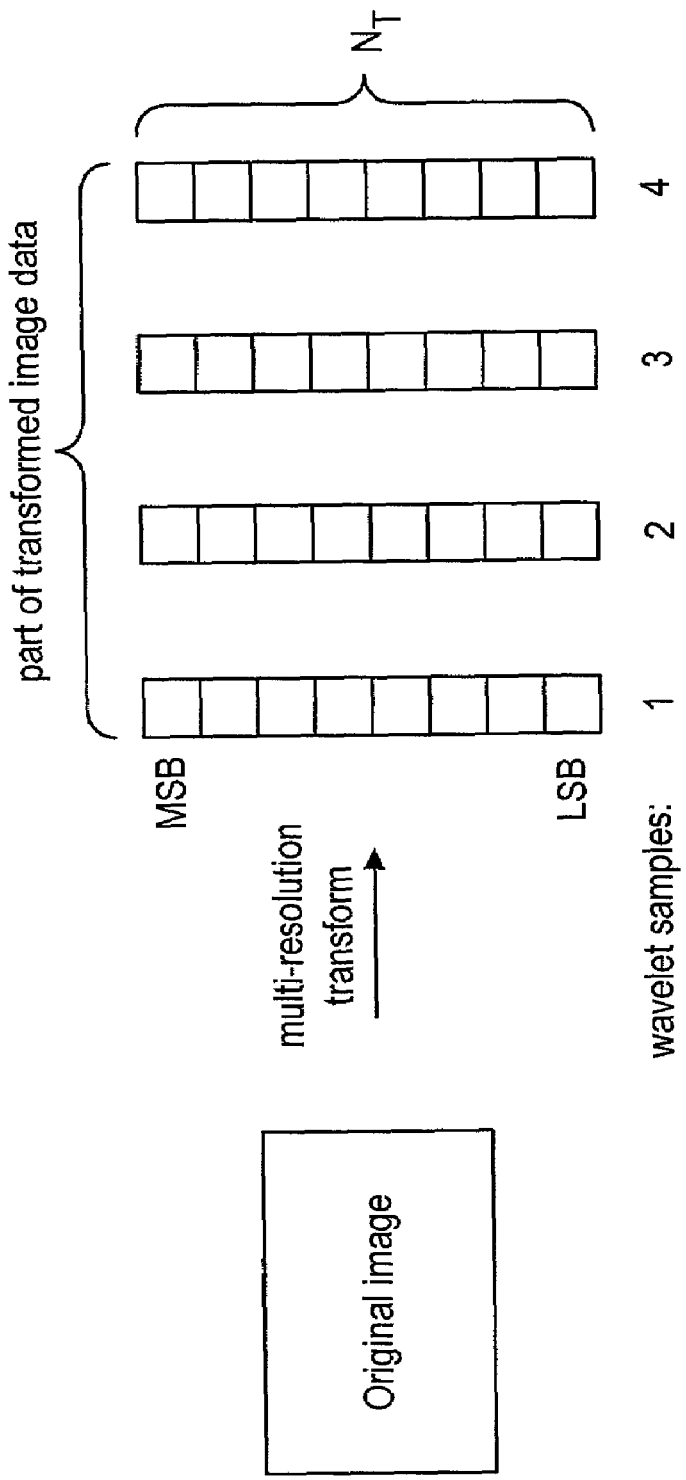
FIG. 1a is a diagrammatic representation illustrating an image being transformed into a plurality of samples.
Figure 1B:
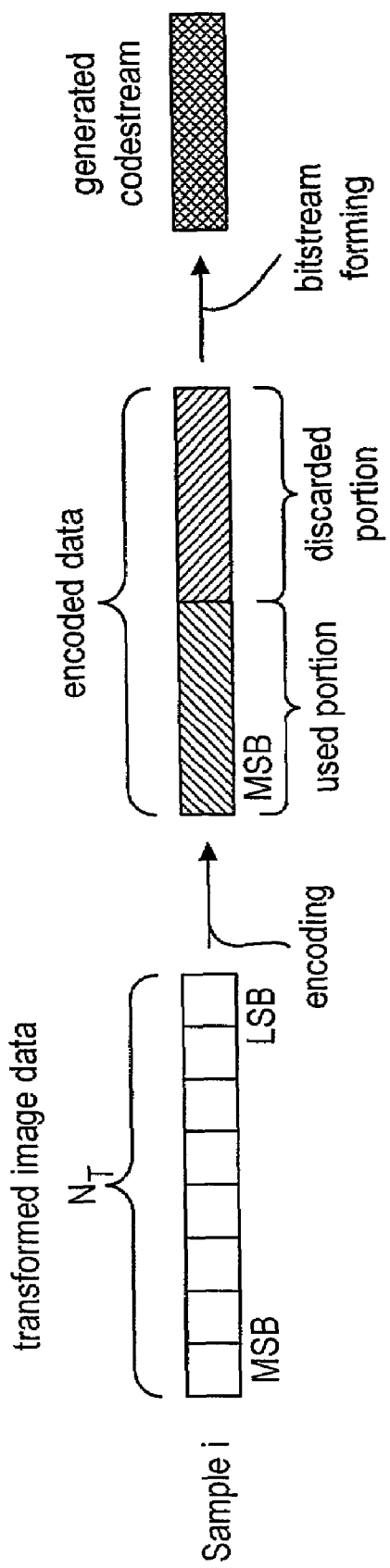
FIG. 1b is a diagrammatic representation illustrating all the bit-planes in each sample being encoded and part of the encoded data being excluded from the generated codestream to meet the transmission bandwidth or storage requirements.

Using the method of bit-plane reduction, according to the present invention, the unused portion of the encoded data is 0, 1 and 2 bit-planes, depending on the types of sub-bands and the resolution levels of the sub-bands. The amount of CPU time for "unnecessary data coding" for each sample is equal to the amount of time for coding 0, 1, and 2 bit-planes, as shown in column 3 of TABLE I. In the brute-force method, as shown in FIGS. 1a and 1b, the unused or discarded portion is always equal to 4 bit-planes, regardless of the types of sub-bands and the resolution levels of the sub-bands. Thus, the amount of CPU time for unnecessary data coding for each sample is equal to the amount of time required for coding 4 bit-planes, as shown in the last entry in column 3 of TABLE I. The method of coding an image, according to the present invention, can save a significant amount of CPU time.

TABLE I

| Sub-band | $N_B$ (bit-planes) | Unnecessary coding (bit-planes) |
|---|---|---|
| LL2 | 2 | 2 |
| LH1 | 2 | 2 |
| HL1 | 2 | 2 |
| HH1 | 3 | 1 |
| LH0 | 3 | 1 |
| HL0 | 3 | 1 |
| HH0 | 4 | 0 |
| All sub-bands (prior art) | N/A | 4 |

FIG. 4 illustrates the image encoding method, according to the present invention. As shown in the flowchart 200, an input image is received at step 210. One or more pre-processing steps are carried out at step 212. For example, in the pre-processing stage, the red (R), green (G) and blue (B) components of the image in the RGB color space may be converted into chrominance (U,V) and luminance (Y) components in the YUV color space. These pre-processing steps are not part of the present invention. The pre-processed image is decomposed by a transform algorithm, such as forward wavelet transform at step 214 into sub-bands containing samples of transformed image data. For each sample, a number of omitted bit-planes is estimated at step 216, based on the type and the resolution level of the sub-band, and the compression factor of the image. The transformed image data is adjusted at step 218 to reduce the number of bit-planes for providing the adjusted transformed image data. The adjusted transformed image data is encoded or compressed at step 220. The encoded data is generated into a codestream at step 222, with possible truncation of bit-planes in an ordering process. At step 224, it is determined whether all the samples in the transformed image data are encoded and included in the codestream.

Figure 5:
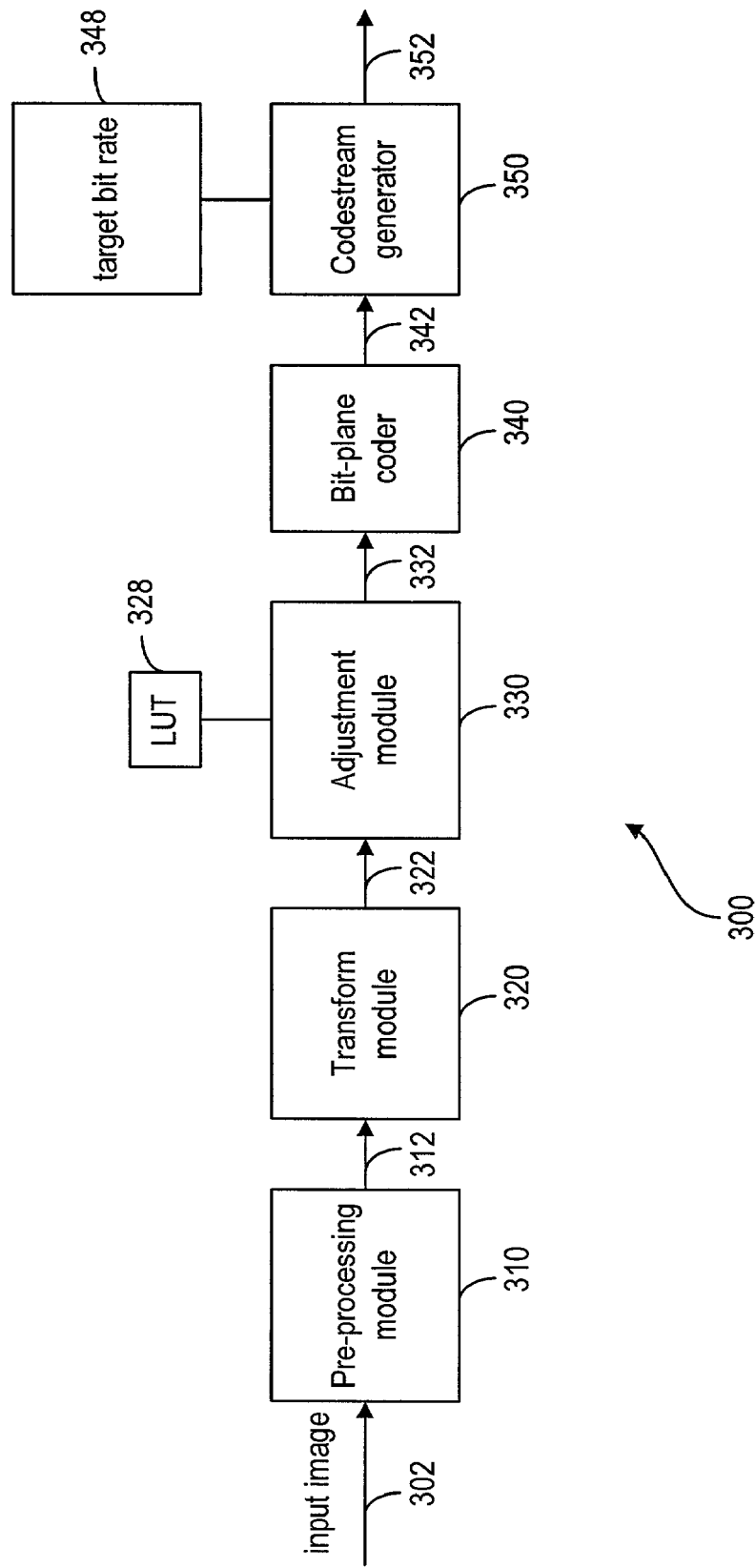
FIG. 5 is a block diagram illustrating an image encoder, according to the present invention.
Figure 6:
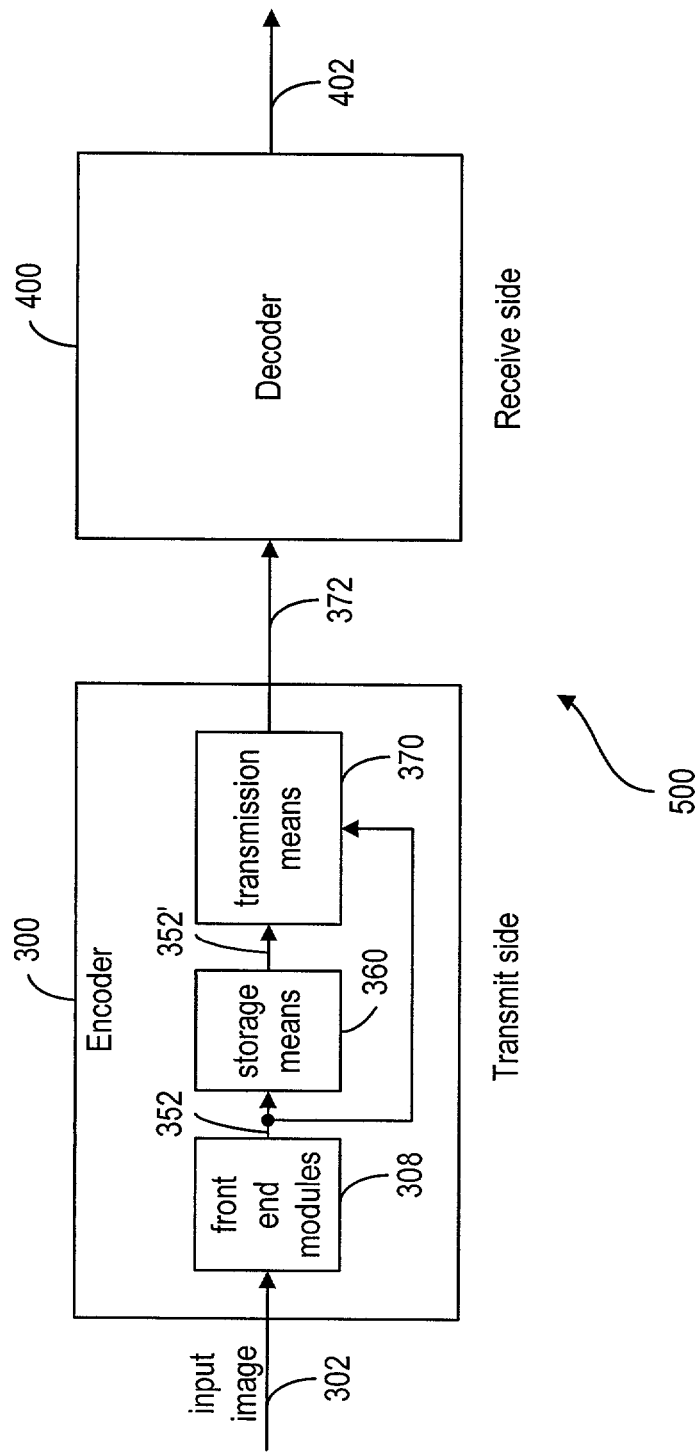
FIG. 6 is a block diagram illustrating an image coding system, according to the present invention.

FIG. 5 illustrates an encoder 300, according to the present invention. As shown, the encoder 300 has a pre-processing module 310 to pre-process an input image 302. The pre-processed image 312 is then decomposed into sub-bands by a transform module 320, wherein each sub-band contains samples of transformed image data 322 organized in a number of bit-planes. The transformed image data 322 is adjusted by an adjustment module 330 to reduce the number of bit-planes in the samples, based on the resolution level of the sub-band and the compression factor of the encoding process. Preferably, the number of bit-planes to be reduced by the adjustment module 330 is stored in a look up table (LUT) 328. The adjusted image data 332 is encoded bit-plane by bit-plane by a bit-plane coder 340. Base on the target bit-rate 348, the codestream generating module 350 truncates the encoded data 342, if necessary to meet the target bit-rate, when generating the codestream 352. The generated codestream 352 can be stored in storage means 360 or transmitted by a transmitter 370 from the transmit side to the receive side of an image coding system 500, as shown in FIG. 6. The transmitted signal is denoted by reference numeral 372. In FIG. 6, the front-end modules 308 include the modules 310–350, as shown in FIG. 5. On the receive side, an encoder 400 reconstructs the input image 302 based on the signal 372. The reconstructed image is denoted by reference numeral 402.

The present invention, as described in conjunction with FIGS. 3a to 6, can be used in a JPEG2000 coder, and the generated codestream based on the reduced transformed image data can be JPEG2000 compliant. However, the present invention is also applicable to other image compression systems, which allows tiling of images and dividing the stream of data in the tiles into parts. Moreover, the method, according to present invention, is not limited to image coding. The same method can be used in video coding where bit-plane coding is performed. It should be noted that the number of omitted bit-planes for each sample, $N_B$, can be adjusted according to the target bit-rate for transmission or the target file size for storage. Furthermore, $N_B$, as described above, is the sum of three weighting indices. However, $N_B$ can be a value of one weighting index or a sum of two, four or more weighting indices. After omitting $N_B$ bit-planes, it is possible that the encoded data to be transmitted is less than that of the target bit-rate.

The present invention can be used in an electronic device such as a mobile telecommunication device, a mobile phone, a personal digital assistant device, a portable computer and the like.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of encoding an image at a compression factor for providing encoded data for transmission or storage, wherein the image is decomposed by a transform into sub-bands of one or more resolution levels, each sub-band containing units of transformed image data organized in a first number of bit-planes, said method comprising the steps of:

assigning to the sub-bands a plurality of weighting indices indicative of the compression factor and the resolution level; adjusting, for each unit, the transformed image data according to at least one of the weighting indices for providing adjusted transformed image data having a second number of bit-planes smaller than the first number; and encoding the adjusted transformed image data for providing the encoding data.

2. The method of claim 1, wherein the units are blocks.

3. The method of claim 1, wherein the units are samples.

4. The method of claim 1, wherein the transform is a wavelet-based transform.

5. The method of claim 4, wherein the transform is JPEG2000 compliant.

6. The method of claim 1, wherein each sub-band is indicative of a group of transformed coefficients resulting from bandpass filtering operations regarding the transform, and wherein the weighting indices are dependent upon the filtering operations.

7. The method of claim 1, wherein each sub-band is indicative of a group of transformed coefficients resulting from bandpass filtering operations regarding the transform and the sub-bands are categorized as HH, HL, LH and LL in accordance with sub-band decomposition in two dimensions, and wherein the weighting indices are dependent upon the sub-band categories.

8. The method of claim 7, wherein sub-band categories are assigned with weighting-values and wherein the weighting index for each sub-band is indicative of the resolution level, the compression factor or the weighting value.

9. The method of claim 8, wherein the weighting value for the HH sub-band category is 1 and the weighting value for each of the other sub-band categories is 0.

10. The method of claim 9, wherein the second number is smaller than the first number by a third number and wherein the third number is the sum of the compression factor, the resolution level and the weighting value.

11. The method of claim 1, wherein the second number is smaller than the first number by a third number and wherein the third number is the sum of the compression factor and the resolution level.

12. The method of claim 1, wherein the image is a video image.

13. The method of claim 1, wherein the image is a digital image.

14. An encoder for use in an electronic device for encoding an image at a compression factor for providing encoded data for transmission or storage, wherein the image is decomposed by a transform into sub-bands of one or more resolution levels, each sub-band containing units of transformed image data represented in a first number of bit-planes, said encoder comprising:

means, responsive to the transformed image data, for assigning to the sub-bands a plurality of weighting indices indicative of the compression factor and the resolution level for providing information indicative of the assigned weighting indices;

means, responsive to the information, for adjusting the transformed image data for each unit according to at least one of the weighting indices for providing further data indicative of adjusted transformed image data having a second number of bit-planes smaller than the first number; and means, responsive to the further data, for encoding the adjusted transformed image data for providing the encoded data.

15. The encoder of claim 14, wherein the units are blocks.

16. The encoder of claim 14, wherein the units are samples.

17. The encoder of claim 14, wherein the transform is a wavelet-based transform.

18. The encoder of claim 14, wherein the transform is JPEG2000 compliant.

19. The encoder of claim 14, wherein each band is indicative of a group of transformed coefficients resulting from bandpass filtering operations regarding the transform, and wherein the weighting indices are dependent upon the filtering operations.

20. The encoder of claim 14, wherein each sub-band is indicative of a group of transformed coefficients resulting from bandpass filtering operations regarding the transform and the sub-bands are categorized as HH, HL, LH and LL in accordance with sub-band decomposition in two dimensions, and wherein the weighting indices are dependent upon the sub-band categories.

21. The encoder of claim 14, wherein the image is a video image.

22. The encoder of claim 14, wherein the image is a digital image.

23. The encoder of claim 14, wherein the electronic device comprises a mobile communication device.

24. The encoder of claim 14, wherein the electronic device comprises a personal digital assistant device.

25. The encoder of claim 14, wherein the electronic device comprises a portable computer.

26. The encoder of claim 14, wherein the electronic device comprises a mobile phone.

27. An image coding system having a transmit side and a receive side, said system comprising:

an encoder on the transmit side for coding an image at a compression factor for providing encoded data for transmission or storage, wherein the image is decomposed by transform into sub-bands of one or more resolution levels, each sub-band containing units of transformed image data represented in a first number of bit-planes, wherein the encoder comprises:

means, responsive to the transformed image data, for assigning to the sub-bands a plurality of weighting indices indicative of the compression factor and the resolution level for providing information indicative of the assigned weighting indices;

means, responsive to the information, for adjusting the transformed image data for each unit according to at least one of the weighting indices for providing further data indicative of adjusted transformed image data having a second number of bit-planes smaller than the first number; and means, responsive to the further data, for encoding the adjusted transformed image data for providing a codestream indicative of the encoded adjusted transformed image data; and a decoder on the receiving side, responsive to codestream, for reconstructing the image based on the encoded adjusted transformed image data.

28. The image encoding system of claim 27, wherein each band is indicative of a group of transformed coefficients resulting from bandpass filtering operations regarding the transform, and wherein the weighting indices are dependent upon the filtering operations.

29. The image encoding system of claim 27, wherein each sub-band is indicative of a group of transformed coefficients resulting from bandpass filtering operations regarding the transform and the sub-bands are categorized as HH, HL, LH and LL in accordance with sub-band decomposition in two dimensions, and wherein the weighting indices are dependent upon the sub-band categories.

30. The image encoding system of claim 27, wherein the image is a video image and said encoding is video encoding.

31. The image encoding system of claim 27, wherein the image is a digital image.

32. The image encoding system of claim 27, wherein the transform is a wavelet-based transform.

33. The image encoding system of claim 27, wherein the encoder is JPEG2000 compliant.

34. The image encoding system of claim 27, wherein the decoder is JPEG2000 compliant.

\* \* \* \* \*